Patented Oct. 31, 1950

2,527,884

UNITED STATES PATENT OFFICE 2,527,884

VITREOUS COMPOSITIONS AND METHODS OF MAKING THE SAME

Fred H. Kaufmann, Wauwatosa, Wis., assignor to Cutler-Hammer, Inc., Milwaukee, Wis., a corporation of Delaware No Drawing. Application January 29, 1949, Serial No. 73,673

6 Claims. (Cl. 106—48)

This invention relates to improvements in vitreous compositions and methods of making the same.

An object of the invention is to provide certain new and improved vitreous compositions which may be applied as coatings to surfaces of articles formed of metal or other materials or as a sealing medium in the space between adjacent surfaces of such articles; which compositions when suitably fired will provide fused coatings and seals which are characterized by high electrical resistance, high thermal shock resistance and unusual mechanical toughness.

Another object is to provide vitreous compositions of the aforementioned character which will adhere to metals and other materials having linear thermal expansion coefficients in the range of $9.3 \times 10^{-6}$ to $11.3 \times 10^{-6}$ centimeters per centimeter per degree centigrade.

Another object is to provide compositions of the aforementioned character which will readily adhere, upon firing, to articles formed of metals or other materials without need for elaborate pretreatment of such articles.

In preparing my improved vitreous compositions, I first melt together ingredients which will yield fused compositions having the constituents set forth below, these constituents being present within the percentage ranges specified. When a homogeneous glassy melt of a viscosity sufficiently low to permit pouring is obtained, the melt is poured in a thin stream into a cold liquid, such as water, for fritting. The resulting frit is then ground into desired particle sizes.

I have found that vitreous compositions which include as their constituents the oxides of aluminum and zinc have exceptionally high electrical resistance and unusual mechanical toughness. The inclusion in such vitreous compositions of calcium fluoride provides unusual thermal expansivity and the inclusion of cobalt oxide permits adhesion of these compositions to the surfaces of metals and other materials whose coefficients of linear thermal expansion are in the range of $9.3 \times 10^{-6}$ to $11.3 \times 10^{-6}$ centimeters per centimeter per degree centigrade. In addition the improved vitreous compositions also contain the oxides of silicon, boron and barium. The improved vitreous compositions will be obtained if the above mentioned constituents are present within certain relatively narrowly defined proportions. These proportions are given in the following table:

TABLE I

| | Per cent |
|---|---|
| Silica, $SiO_2$ | 15 to 30 |
| Boric oxide, $B_2O_3$ | 6 to 20 |
| Barium oxide, BaO | 15 to 40 |
| Fluospar, $CaF_2$ | 17 to 35 |
| Zinc oxide, ZnO | 3 to 10 |
| Alumina, $Al_2O_3$ | 1 to 8 |
| Cobalt oxide, CoO | 0.5 to 3 |

It has been found that vitreous compositions having the above constituents present within the ranges of proportions specified will have unusually high electrical resistance which is on the order of 50 to 61 megohms at 760° F. Further it has been found that vitreous compositions of the above character when applied as coatings on the surfaces of metals will withstand mechanical shocks on the order of 2,000 foot-pounds without damage thereto or without separating from the metal surfaces with which they are bonded. All percentages given above are by weight, based on the total weight of the vitreous composition.

Alternatively, the vitreous compositions may also contain potassium oxide in amounts ranging from 4 to 11 per cent. Although the presence of the latter as a constituent is not essential to the practice of my invention, its presence enhances fusibility of the batch materials by reducing the temperature at which fusion will occur and also tends to reduce brittleness of the resulting compositions.

As examples of various batch compositions which may be melted to yield vitreous compositions having the constituents and relative percentages as given in Table I, the following are illustrative. The various materials present in a batch are thoroughly mixed and melted until substantially homogeneous, glassy melts are obtained,

TABLE II

*Suitable batch compositions to provide the improved vitreous compositions*

| Constituent | Batch A | Batch B | Batch C | Batch D |
|---|---|---|---|---|
| | Per cent | Per cent | Per cent | Per cent |
| Silica ($SiO_2$) | 27.73 | 18.27 | 18.54 | 24.65 |
| Boric Acid ($H_3BO_3$) | 7.28 | 23.95 | 24.29 | 6.48 |
| Fluorspar ($CaF_2$) | 18.75 | 23.69 | 24.02 | 26.89 |
| Barium Carbonate ($BaCO_3$) | 37.70 | 21.75 | 17.65 | 33.51 |
| Zinc Oxide (ZnO) | 5.63 | 3.38 | 3.43 | 5.01 |
| Alumina ($Al_2O_3$) | 1.92 | 3.38 | 1.37 | 1.71 |
| Cobalt Oxide ($Co_3O_4$) | 0.99 | 0.62 | 0.63 | 1.75 |
| Potassium Carbonate ($K_2CO_3$) | | 4.96 | 10.07 | |

All percentages are by weight, based on the total weight of the batch.

When melted the batch composition given in Table II yields vitreous compositions having the constituents given in the percentages by weight specified.

TABLE III

*Frit compositions prepared from batches of Table II*

| Constituent | Enamel A | Enamel B | Enamel C | Enamel D |
|---|---|---|---|---|
| | Per cent | Per cent | Per cent | Per cent |
| Silica ($SiO_2$) | 27.68 | 21.95 | 22.50 | 27.82 |
| Boric Oxide ($B_2O_3$) | 7.33 | 16.26 | 16.67 | 4.13 |
| Fluorspar ($CaF_2$) | 18.76 | 28.46 | 29.16 | 30.44 |
| Barium Oxide (BaO) | 37.69 | 20.33 | 16.67 | 29.33 |
| Zinc Oxide (ZnO) | 5.63 | 4.06 | 4.17 | 5.66 |
| Alumina ($Al_2O_3$) | 1.92 | 4.06 | 1.67 | 1.93 |
| Cobalt Oxide (CoO) | 0.99 | 0.81 | 0.83 | 0.69 |
| Potassium Oxide ($K_2O$) | | 4.07 | 8.33 | |

All percentages are by weight, based on the total weight of the composition.

The improved vitreous compositions specified are prepared in the manner usually employed in preparing vitreous materials. This involves mechanically mixing the powdered batch constituents and then melting the batch in a suitable furnace to produce a uniform melt of a viscosity sufficiently low to permit its being poured. The melting temperature may vary somewhat, but will generally fall within the range of 2000° to 2500° F. After melting, the fused compositions are poured in a thin stream into water. The resulting frit is thereafter reduced to the desired particle sizes by grinding in a ball mill or the like; for most purposes a size no greater than that which will pass through a 200 mesh screen being desirable.

The ground frits thus obtained, without additions thereto, may be used to seal the spaces between adjacent surfaces of articles formed of metal and other materials. Preparatory to sealing, it is merely necessary to clean the surfaces of the articles by sand blasting. Then a suitable amount of frit, such as will fill the spaces when loosely packed, is inserted and the assembly is then heated to a temperature adequate to plasticize the frit into a homogeneous mass. The assembly is then permitted to cool and the fused frit hardens into a tough adhering mass in the spaces.

Slips suitable for applying the vitreous compositions as coatings on surfaces of articles formed of metal and other materials may be readily made by mixing the same with a suitable suspension agent and an electrolyte in a water solution. An enamel clay serves as a suitable suspension agent and magnesium carbonate acts as a satisfactory electrolyte. One highly satisfactory slip may be obtained by mixing one of the preferred frits in amount of 94.5%, an enamel clay in amount of 5% and magnesium carbonate in amount of 0.5% with water in such amount as will yield a slip having a specific gravity of 1.85; the percentages specified being based on the total weight of the frit, clay and magnesium carbonate in the mixture. Other satisfactory slips may also be obtained if the amounts of frit, enamel clay, magnesium carbonate and water are varied within narrowly defined ranges which are as follows: frit 92 to 97%, enamel clay 2 to 7%, magnesium carbonate 0.1 to 1% and water such as will yield slips having specific gravities in the range of 1.8 to 1.9.

Preparatory to applying the slips to the surfaces of metals or other materials, such surfaces should be cleaned by sand blasting. Application of the slips may be done in the usual ways as by dipping, slushing, spraying, etc. Following the application of the slips, the articles are fired at such temperatures as will cause the coatings to fuse to the surfaces and cover them in a smooth, sheet-like manner and have a glossy appearance. Upon cooling the coatings will have hardened to the consistency of glass and will adhere strongly to the articles. Such hardened coatings will have a smooth glossy appearance and will have the physical characteristics hereinbefore enumerated.

Desired thickness for the coatings may be obtained by repeating the process outlined above one or more times as needed.

Various modifications may be made in the novel compositions as described without departing from my invention, certain preferred embodiments of which have been given herein as illustrative. The exact manner of melting the batch constituents may be varied as desired, provided a homogeneous fluid glass melt is obtained before fritting. Accordingly, my invention is to be construed in accordance with the appended claims, it being understood that the alternative addition and procedures may be adopted without departing from the scope of the claims.

I claim:

1. A vitreous composition consisting of silica in amounts ranging from 15 to 30%, boric oxide in amounts ranging from 6 to 20%, barium oxide in amounts ranging from 15 to 40%, fluorspar in amounts ranging from 17 to 35%, zinc oxide in amounts ranging from 3 to 10%, alumina in amounts ranging from 1 to 8%, and cobalt oxide in amounts ranging from 0.5 to 3%, said percentages being by weight based on the total weight of said vitreous composition.

2. A vitreous composition consisting of silica in amounts ranging from 15 to 30%, boric oxide in amounts ranging from 6 to 20%, barium oxide in amounts ranging from 15 to 40%, fluorspar in amounts ranging from 17 to 35%, zinc oxide in amounts ranging from 3 to 10%, alumina in amounts ranging from 1 to 8%, cobalt oxide in amounts ranging from 0.5 to 3%, and potassium oxide in amounts ranging from 4 to 11%, said percentages being by weight based on the total weight of said vitreous composition.

3. A vitreous composition consisting of silica in the amount of 27.68%, boric oxide in the amount of 7.33%, barium oxide in the amount of 37.69%, fluorspar in the amount of 18.76%, zinc oxide in the amount of 5.63%, alumina in the amount of 1.92%, and cobalt oxide in the amount of 0.99%, said percentages being by weight based on the total weight of said vitreous composition.

4. The method of preparing a vitreous composition which comprises fusing ingredients which, when melted, will yield a fluid glass having the following constituents in the percentages noted:

| | Per cent |
|---|---|
| Silica | 15 to 30 |
| Boric oxide | 6 to 20 |
| Barium oxide | 15 to 40 |
| Fluorspar | 17 to 35 |
| Zinc oxide | 3 to 10 |
| Alumina | 1 to 8 |
| Cobalt oxide | 0.5 to 3 | said percentages being by weight based on the total weight of said composition, pouring said fused composition into a liquid to frit the same and grinding said frit into particle sizes sufficiently fine to permit utilization of said frit as a sealing medium or as a coating when mixed in a water solution with a suspension agent and electrolyte.

5. The method of preparing a vitreous composition which comprises fusing ingredients which, when melted, will yield a fluid glass having the following constituents in the percentages noted:

| | Per cent |
|---|---|
| Silica | 15 to 30 |
| Boric oxide | 6 to 20 |
| Barium oxide | 15 to 40 |
| Fluorspar | 17 to 35 |
| Zinc oxide | 3 to 10 |
| Alumina | 1 to 8 |
| Cobalt oxide | 0.5 to 3 |
| Potassium oxide | 4 to 11 | said percentages being by weight based on the total weight of said composition, pouring said fused composition into a liquid to frit the same, and grinding said frit into particle sizes sufficiently fine to permit utilization of said frit as a sealing medium or as a coating when mixed in a water solution with a suspension agent and electrolyte.

6. The method of preparing a vitreous composition which comprises fusing ingredients which, when melted, will yield a fluid glass having the following constituents in the percentages noted:

| | Per cent |
|---|---|
| Silica | 27.68 |
| Boric oxide | 7.33 |
| Barium oxide | 37.69 |
| Fluorspar | 18.76 |
| Zinc oxide | 5.63 |
| Alumina | 1.92 |
| Cobalt oxide | 0.99 | said percentages being by weight based on the total weight of said composition, pouring said fused composition into a liquid to frit the same, and grinding said frit into particle sizes sufficiently fine to permit utilization of said frit as a sealing medium or as a coating when mixed in a water solution with a suspension agent and electrolyte.

FRED H. KAUFMANN.

REFERENCES CITED

The following references are of record in the file of this patent:

UNITED STATES PATENTS

| Number | Name | Date |
|---|---|---|
| 1,833,087 | Migeot | Nov. 24, 1931 |
| 2,272,747 | Hull et al. | Feb. 10, 1942 |